(12) United States Patent
Gomez et al.

(10) Patent No.: US 9,868,664 B2
(45) Date of Patent: Jan. 16, 2018

(54) LOW CTE, ION-EXCHANGEABLE GLASS COMPOSITIONS AND GLASS ARTICLES COMPRISING THE SAME

(71) Applicant: Corning Incorporated, Corning, NY (US)

(72) Inventors: Sinue Gomez, Corning, NY (US); Timothy James Kiczenski, Corning, NY (US); John Christopher Mauro, Corning, NY (US); Robert Anthony Schaut, Painted Post, NY (US); Morten Mattrup Smedskjaer, Aalborg (DK); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/380,446

(22) PCT Filed: Feb. 27, 2013

(86) PCT No.: PCT/US2013/028093
§ 371 (c)(1),
(2) Date: Aug. 22, 2014

(87) PCT Pub. No.: WO2013/130665
PCT Pub. Date: Sep. 6, 2013

(65) Prior Publication Data
US 2015/0030827 A1    Jan. 29, 2015

Related U.S. Application Data

(60) Provisional application No. 61/604,833, filed on Feb. 29, 2012.

(51) Int. Cl.
| | | |
|---|---|---|
| *C03C 3/093* | (2006.01) | |
| *C03C 3/091* | (2006.01) | |
| *C03C 3/085* | (2006.01) | |
| *C03C 21/00* | (2006.01) | |
| *B32B 17/00* | (2006.01) | |
| *C03C 4/18* | (2006.01) | |
| *C03B 17/02* | (2006.01) | |

(52) U.S. Cl.
CPC .............. *C03C 3/093* (2013.01); *B32B 17/00* (2013.01); *C03C 3/091* (2013.01); *C03C 4/18* (2013.01); *C03C 21/002* (2013.01); *B32B 2307/308* (2013.01); *B32B 2307/558* (2013.01); *C03B 17/02* (2013.01); *C03C 2204/00* (2013.01); *Y02P 40/57* (2015.11); *Y10T 428/24942* (2015.01)

(58) Field of Classification Search
CPC ......... C03C 3/091; C03C 3/093; C03C 3/085; C03C 3/087; C03C 21/002; C03C 4/18; C03C 2204/00; C09K 19/00; B32B 17/00; B32B 2307/558; B32B 2307/308
See application file for complete search history.

(56) References Cited

U.S. PATENT DOCUMENTS

| | | |
|---|---|---|
| 3,582,454 A | 6/1971 | Giffen |
| 3,630,704 A | 12/1971 | Garfinkel et al. |
| 3,673,049 A | 6/1972 | Giffen et al. |
| 3,737,294 A | 6/1973 | Dumbaugh, Jr. et al. |
| 3,746,526 A | 7/1973 | Giffon |
| 3,798,013 A | 3/1974 | Inoue et al. |
| 3,849,097 A | 11/1974 | Giffen et al. |
| 3,931,438 A | 1/1976 | Beall et al. |
| 4,023,953 A | 5/1977 | Megles, Jr. et al. |
| 4,102,664 A | 7/1978 | Dumbaugh, Jr. |
| 4,214,886 A | 7/1980 | Shay et al. |

(Continued)

FOREIGN PATENT DOCUMENTS

| | | |
|---|---|---|
| EP | 1376647 A2 | 1/2004 |
| GB | 1157898 A | 7/1969 |

(Continued)

OTHER PUBLICATIONS

International Search Report and Written Opinion, dated Dec. 3, 2013, pp. 1-10, International Patent Application No. PCT/US2013/028093, European Patent Office, The Netherlands.

Flugel, Thermal Expansion Calculation for Silicate Glasses at 210° C. based on a Systematic Analysis of Global Databases, dated Feb. 2010, pp. 191-201,Glass Technol.: Eur. J. Glass Sci. Technol., Part A, vol. 51, No. 5.

Clasen, Preparation and Sintering of High-Density Green Bodies to High-Purity Silica Glasses, Jun. 11, 1986, pp. 335-343, Journal of Non-Crystalline Solids 89, Amsterdam.

(Continued)

*Primary Examiner* — Elizabeth A Bolden
(74) *Attorney, Agent, or Firm* — Michael A. Hood

(57) ABSTRACT

Glass compositions and glass articles comprising the glass compositions are disclosed. In one embodiment, a glass composition includes from about 65 mol. % to about 70 mol. % SiO2; from about 9 mol. % to about 14 mol. % $Al_2O_3$; and from about 0 mol. % to about 11 mol. % $B_2O_3$ as glass network formers. The glass composition also includes from about 5 mol. % to less than 10 mol. % alkali oxide $R_2O$, wherein R is at least one of Li, Na, and K. The glass composition also includes from about 3 mol. % to about 11 mol. % of divalent oxide MO, wherein M is at least one of Mg, Ca, Ba, SrO and Zn. The glass composition has a coefficient of thermal expansion which is less than or equal to $55 \times 10^{-7}/°$ C. and is amenable to strengthening by ion-exchange. The glass composition is well suited for use as the glass cladding layers of a laminated glass article.

19 Claims, 5 Drawing Sheets

(56) References Cited

U.S. PATENT DOCUMENTS

| | | | |
|---|---|---|---|
| 4,259,118 A * | 3/1981 | Sack | C03C 3/091 |
| | | | 501/66 |
| 4,457,771 A | 7/1984 | Ambrogi | |
| 5,342,426 A | 8/1994 | Dumbaugh, Jr. | |
| 5,559,060 A | 9/1996 | Dumbaugh, Jr. et al. | |
| 6,516,634 B1 | 2/2003 | Green et al. | |
| 7,201,965 B2 | 4/2007 | Gulati et al. | |
| 7,207,193 B2 | 4/2007 | Xun et al. | |
| 7,414,001 B2 | 8/2008 | Helfinstine et al. | |
| 7,430,880 B2 | 10/2008 | Butts et al. | |
| 7,514,149 B2 | 4/2009 | Bocko et al. | |
| 7,666,511 B2 | 2/2010 | Ellison et al. | |
| 7,681,414 B2 | 3/2010 | Pitbladdo | |
| 7,685,840 B2 | 3/2010 | Allaire et al. | |
| 7,818,980 B2 | 10/2010 | Burdette et al. | |
| 7,871,703 B2 | 1/2011 | Shelestak et al. | |
| 8,007,913 B2 | 8/2011 | Coppola et al. | |
| 8,075,999 B2 | 12/2011 | Barefoot et al. | |
| 8,211,505 B2 | 7/2012 | Bocko et al. | |
| 8,304,078 B2 | 11/2012 | Varshneya | |
| 8,312,739 B2 | 11/2012 | Lee et al. | |
| 8,415,013 B2 | 4/2013 | Barefoot et al. | |
| 8,561,429 B2 | 10/2013 | Allan et al. | |
| 8,642,175 B2 | 2/2014 | Hashimoto et al. | |
| 8,685,873 B2 | 4/2014 | Siebers et al. | |
| 8,813,520 B2 | 8/2014 | Hashimoto et al. | |
| 8,916,487 B2 * | 12/2014 | Kawai | C03C 3/097 |
| | | | 501/66 |
| 9,302,937 B2 | 4/2016 | Gulati et al. | |
| 2004/0197575 A1 | 10/2004 | Bocko et al. | |
| 2005/0083058 A1 | 4/2005 | Itoh et al. | |
| 2006/0127679 A1 | 6/2006 | Gulati et al. | |
| 2009/0202808 A1 | 8/2009 | Glaesemann et al. | |
| 2009/0217705 A1 | 9/2009 | Filippov et al. | |
| 2009/0220761 A1 | 9/2009 | Dejneka et al. | |
| 2010/0009154 A1 | 1/2010 | Allan et al. | |
| 2010/0029460 A1 * | 2/2010 | Shojiya | C03C 3/085 |
| | | | 501/64 |
| 2010/0035038 A1 | 2/2010 | Barefoot et al. | |
| 2010/0084016 A1 | 4/2010 | Aitken et al. | |
| 2010/0129944 A1 * | 5/2010 | Shimada | C03C 3/087 |
| | | | 438/27 |
| 2011/0017297 A1 | 1/2011 | Aitken et al. | |
| 2011/0019123 A1 | 1/2011 | Prest et al. | |
| 2011/0067447 A1 | 3/2011 | Zadesky et al. | |
| 2011/0200805 A1 | 8/2011 | Tomamoto et al. | |
| 2011/0281093 A1 | 11/2011 | Gulati et al. | |
| 2011/0294648 A1 | 12/2011 | Chapman et al. | |
| 2011/0312483 A1 | 12/2011 | Nakashima et al. | |
| 2012/0194974 A1 | 8/2012 | Weber et al. | |
| 2012/0208028 A1 | 8/2012 | Hashimoto et al. | |
| 2012/0216569 A1 | 8/2012 | Allan et al. | |
| 2012/0219792 A1 * | 8/2012 | Yamamoto | C03C 3/087 |
| | | | 428/336 |
| 2012/0236477 A1 | 9/2012 | Weber | |
| 2012/0236526 A1 | 9/2012 | Weber | |
| 2013/0063885 A1 | 3/2013 | Shedletsky et al. | |
| 2013/0224492 A1 | 8/2013 | Bookbinder et al. | |
| 2013/0236666 A1 | 9/2013 | Bookbinder et al. | |
| 2014/0109616 A1 | 4/2014 | Varshneya | |
| 2014/0139978 A1 | 5/2014 | Kwong | |
| 2014/0141217 A1 | 5/2014 | Gulati et al. | |
| 2014/0174131 A1 | 6/2014 | Saito et al. | |
| 2015/0030827 A1 | 1/2015 | Gomez et al. | |
| 2015/0037552 A1 | 2/2015 | Mauro | |
| 2015/0251383 A1 | 9/2015 | Beall et al. | |

FOREIGN PATENT DOCUMENTS

| | | | |
|---|---|---|---|
| JP | 2013028512 | 2/2013 | |
| KR | 2012026098 A | 3/2012 | |
| KR | 2013135834 A | 12/2013 | |
| WO | 2004055837 A1 | 7/2004 | |
| WO | 2011/103798 | 1/2011 | |
| WO | 2011041484 A1 | 4/2011 | |
| WO | WO 2011065293 A1 * | 6/2011 | C03C 3/087 |
| WO | WO 2012001914 A1 * | 1/2012 | C03C 3/097 |
| WO | 2012074983 A1 | 6/2012 | |
| WO | 2012125857 A1 | 9/2012 | |
| WO | 2013065648 A1 | 5/2013 | |
| WO | 2013088856 A1 | 6/2013 | |
| WO | 2013154034 A1 | 10/2013 | |
| WO | 2014030738 A1 | 2/2014 | |

OTHER PUBLICATIONS

Fluegel, Thermal Expansion Calculation for Silicate Glasses at 210C based on a Systematic Analysis of Global Databases, Oct. 2010, pp. 191-201, Glass Technology: European Journal of Glass Science and Technology Part A vol. 51, No. 5.

Fillery, Ion-Exchanged Glass Laminates that Exhibit a Threshold Strength, Aug. 2007, pp. 2502-2509, J. Am. Ceram. Soc. 90.

Lapp, "AMLCD Substrates Trends in Technology: Technical Information Paper," dated Nov. 2014, pp. 1-5, Corning Incorporated, New York.

Borelli et al., "Glass Strengthening with an Ultrafast Laser," dated 2008, pp. 185-189, Paper M404, International Congress on Applications of Lasers & Electro-Optics.

Gy, Rene; I on Exchange for Glass Strenghening; Nov. 2007; Materials Science & Engineering; vol. 149, pp. 159-165.

Lange, et al., Heat capacities of Fe2O3-bearing silicate liquids, 1992, pp. 311-320, Contrib Mineral Petrol, Princeton, NY USA.

Ussler, et al., Phase equilibria along a basalt-rhyolite mixing line: implications for the origin of calc-alkaline intermediate magma, 1989, pp. 232-244, Contrib Mineral Petrol, Chapel Hill, NC USA.

Whittington, The viscosity of hydrous phonolites and trachytes, Feb. 9, 2000, pp. 209-233, Chemical Geology 174, Hannover, Germany.

Giordano, et al. Glass transition temperatures of natural hydrous melts: a relationship with shear viscosity and implications for the welding process, Oct. 22, 2003, pp. 105-118, Journal of Volcanology and Geothermal Research 142, Munich, Germany.

Richet, et al., Energetics of water dissolution in trachyte glasses and liquids, May 25, 2004, pp. 5151-5158, Geochimica et Cosmachimica Acta, vol. 68, No. 24., Easton, PA USA.

Richet, et al., Water and the density of silicate glasses, Nov. 5, 1999, pp. 337-347, Contrib Mineral Petrol, Urbana, IL USA.

Rivers, et al., Ultrasonic Studies of Silicate Melts, Aug. 10, 1987, pp. 9247-9270, Journal of Geophysical Research, vol. 92, Berkeley, CA USA.

European Office Action, dated Apr. 12, 2016, pp. 1-6, European Application No. 13708623.7, European Patent Office, Munich Germany.

Notice on the First Office Action, dated Apr. 8, 2016, pp. 1-10, Chinese Application No. 201380019915.0, The State Intellectual Property Office of the People's Republic of China, China.

Search Report and Summary of Official Letter, dated Jun. 30, 2016, pp. 1-3, Taiwan Application No. 102107040, Taiwan Intellectual Property Office, Taiwan.

English Translation of JP2014559999 Office Action Dated December 13, 2016; 3 pages; Patent Office Japanese.

* cited by examiner

LOW CTE, ION-EXCHANGEABLE GLASS COMPOSITIONS AND GLASS ARTICLES COMPRISING THE SAME

CROSS-REFERENCE TO RELATED APPLICATIONS

This application is a national stage entry under 35 U.S.C. §371 of International Application No. PCT/US2013/028093, filed on Feb. 27, 2013, which claims the benefit of priority under 35 U.S.C. §119 of U.S. Provisional Application No. 61/604,833, filed on Feb. 29, 2012, the content of which is relied upon and incorporated herein by reference in its entirety.

BACKGROUND

Field

The present specification generally relates to glass compositions and, more specifically, to glass compositions which have a relatively low average CTE and which are amenable to strengthening by ion-exchange and glass articles comprising the same.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Various processes may be used to strengthen glass articles, including chemical tempering, thermal tempering, and lamination. Chemical tempering generally involves exchanging smaller alkali ions in the glass article (such as lithium ions and/or sodium ions) for larger alkali ions (such as potassium ions) by submerging the glass article in a molten salt bath which contains the larger alkali ions. Accordingly, in order to facilitate the chemical tempering or ion-exchange process, the glass article generally includes a relatively high concentration of alkali ions.

The presence of alkali ions in the glass article generally increases the average coefficient of thermal expansion of the glass article and, as such, the glass article may not be suitable for use in applications where a glass article with a relatively lower average coefficient of thermal expansion is required, such as the clad glass of a laminate strengthened glass article.

Accordingly, a need exists for alternative glass compositions which have a relatively low average coefficient of thermal expansion and which are also amenable to strengthening by ion-exchange, and glass articles incorporating the same.

SUMMARY

According to one embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba and Zn. The glass composition generally has an average coefficient of thermal expansion of a glass formed from the glass composition is less than or equal to $55 \times 10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise. Due to the relatively low average coefficient of thermal expansion, the glass composition is particularly well suited for use as the glass cladding layers of a laminated glass article, such as a laminated glass article formed by a fusion lamination process.

In one set of embodiments, a glass article includes a glass core layer disposed between a first glass cladding layer and a second glass cladding layer. In some of these embodiments, the core glass may have a first surface and a second surface opposite the first surface, where the first glass cladding layer may be fused to the first surface of the glass core layer and a second glass cladding layer may be fused to the second surface of the glass core layer. In other embodiments, a first diffusive glass layer may be disposed between the glass core layer and the first glass cladding layer; additionally a second diffusive glass layer may be disposed between the glass core layer and the second glass cladding layer; these diffusive layers may be formed during, for example, the fusion forming process. The first glass cladding layer and the second glass cladding layer are formed from a glass composition which may include from about 55 mol. % to about 70 mol. % $SiO_2$; from about 9 mol. % to about 14 mol. % $Al_2O_3$; and from about 0 mol. % to about 11 mol. % $B_2O_3$. The glass composition may further include from about 5 mol. % to less than 10 mol. % alkali oxide $R_2O$, wherein R is at least one of Li, Na, and K. The glass cladding layer may further include from about 3 mol. % to about 11 mol. % of divalent oxide MO, wherein M is at least one of Mg, Ca, Ba and Zn. The glass composition generally has an average coefficient of thermal expansion which is less than or equal to $55 \times 10^{-7}/°$ C. and is amenable to strengthening by ion-exchange.

Additional features and advantages of the glass compositions and glass articles comprising the glass compositions will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
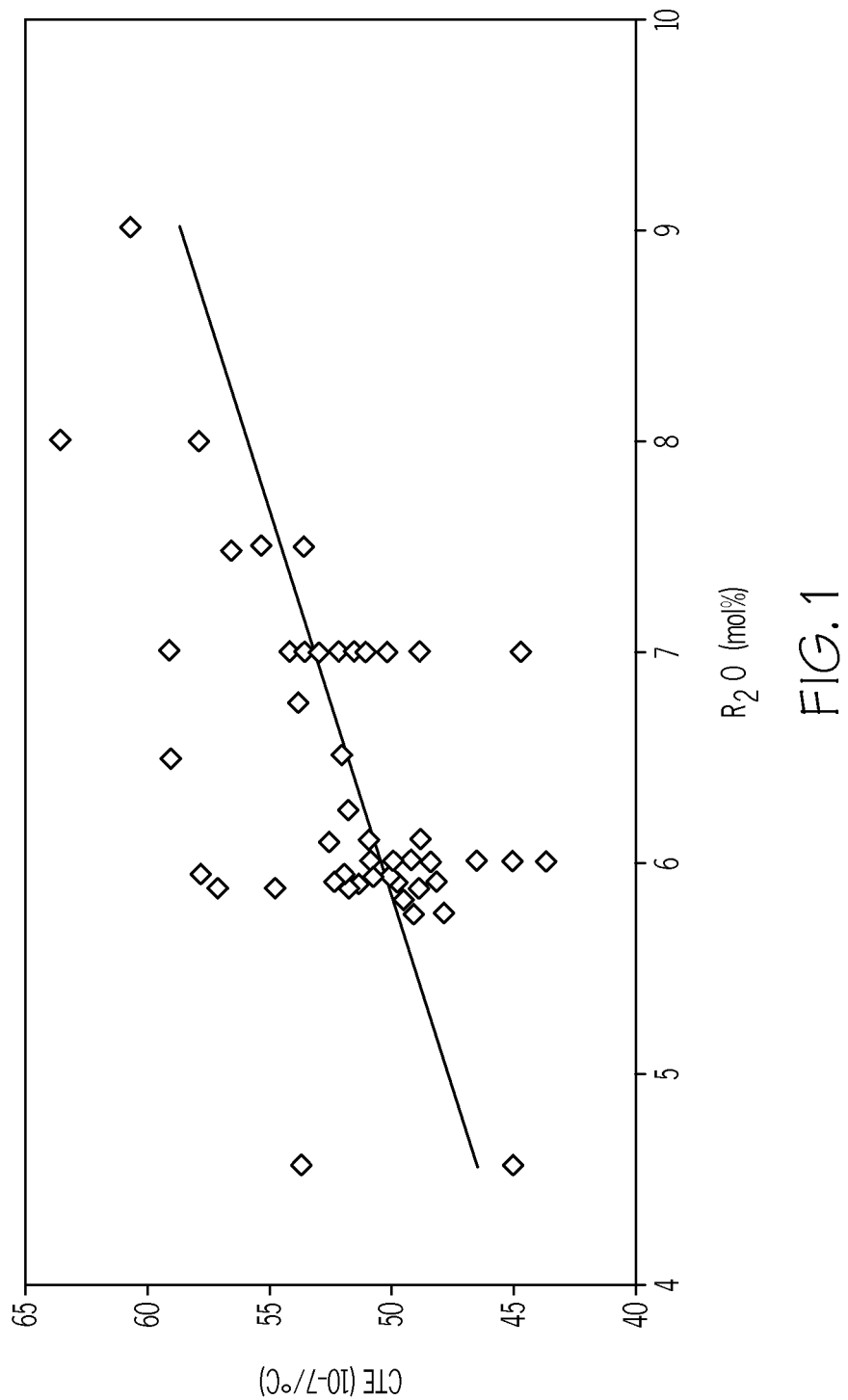
FIG. 1 graphically depicts the average coefficient of thermal expansion (y-axis) of a glass composition as a function of the concentration of alkali oxide (x-axis) contained in the glass composition.

Reference will now be made in detail to embodiments of glass compositions having low coefficients of thermal expansion and glass articles incorporating the same, examples of which are illustrated in the accompanying drawings. Whenever possible, the same reference numerals will be used throughout the drawings to refer to the same or like parts. The glass compositions described herein generally have relatively low coefficients of thermal expansion and, as such, may be utilized in conjunction with core glass compositions having relatively high coefficients of thermal expansion to produce laminated glass articles which are compressively stressed without being ion-exchanged or thermally tempered. The glass compositions described herein are also amenable to further strengthening by ion-exchange to increase the surface compression in the glass. In one embodiment, a glass composition may include from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba and Zn. The glass composition generally has an average coefficient of thermal expansion which is less than or equal to $55 \times 10^{-7}/°$ C. The glass compositions and laminated glass articles comprising the glass composition will be further described herein with specific reference to the appended drawings.

The term "liquidus viscosity," as used herein, refers to the shear viscosity of the glass composition at its liquidus temperature;

The term "liquidus temperature," as used herein, refers to the highest temperature at which devitrification occurs in the glass composition;

The term "CTE," as used herein, refers to the coefficient of thermal expansion of the glass composition averaged over a temperature range from about 20° C. to about 300° C.

In the embodiments of the glass compositions described herein, the concentration of constituent components (e.g., $SiO_2$, $Al_2O_3$, $B_2O_3$ and the like) are specified in mole percent (mol. %) on an oxide basis, unless otherwise specified.

As will be described in further detail herein, strengthened laminated glass articles may be formed by fusing glass cladding layers having a relatively low average coefficient of thermal expansion to a glass core layer which has a relatively high average coefficient of thermal expansion. As the laminated structure cools, the differences in the coefficients of thermal expansion of the glass core layer and the glass cladding layer create compressive stresses in the glass cladding layers. While these compressive stresses extend deeply into the clad glass layer of the laminated glass article, the compressive stress at the surface of the laminated glass article is often low, requiring that the laminated glass article be ion-exchange strengthened to obtain the desired surface compression. However, glass compositions which have coefficients of thermal expansion suitable for use as glass cladding layers and which are amenable to ion-exchange strengthening can be difficult to manufacture as the alkali ions necessary to facilitate ion-exchange strengthening generally increase the average coefficient of thermal expansion of the glass, making the glass unsuitable for use as a glass cladding layer in a laminated article. The glass compositions disclosed herein have a relatively low CTE and are also amenable to ion-exchange strengthening and, as such, are suitable for use as glass cladding layers in a laminated glass article.

In the embodiments of the glass compositions described herein, $SiO_2$ is the largest constituent of the composition and, as such, $SiO_2$ is the primary constituent of the glass network. When the concentration of $SiO_2$ in the glass composition is low (i.e., less than about 55 mol. %) the chemical durability of the resultant glass is low. In addition, the liquidus viscosity of the resultant glass may also be low rendering the glass unsuitable for fusion formation, such as with a fusion down draw process and/or a fusion lamination process. However, if the concentration of $SiO_2$ in the glass composition is too high (i.e., greater than about 70 mol. %), the formability of the glass composition may be diminished as higher concentrations of $SiO_2$ increase the difficulty of melting the glass which, in turn, adversely impacts the formability of the glass. In the embodiments described herein, the glass composition generally comprises $SiO_2$ in a concentration greater than or equal to about 55 mol. % and less than or equal to about 70 mol. % in order to facilitate fusion forming the glass compositions. In some embodiments, the concentration of $SiO_2$ in the glass composition is greater than or equal to about 65 mol. % and less than or equal to about 70 mol. %. In still other embodiments, the amount of $SiO_2$ in the glass composition is greater than or equal to about 65 mol. % and less than or equal to about 68 mol. %. In some other embodiments, the glass composition comprises $SiO_2$ in a concentration from about 63 mol. % to about 66 mol. %.

The glass compositions described herein also comprise $Al_2O_3$. $Al_2O_3$ serves as a glass network former, similar to $SiO_2$. Like $SiO_2$, $Al_2O_3$ increases the viscosity of the glass composition due to its primarily tetrahedral coordination in a glass melt formed from the glass composition. Further, an increase in the concentration of $Al_2O_3$ relative to alkali oxides or alkaline earth oxides in the glass composition generally decreases the CTE of the glass composition and increases the durability of the glass composition. $Al_2O_3$ also improves the ion-exchange performance of the glass composition by increasing the strain point of the glass and increasing the diffusivity of alkali ions in the glass network. Accordingly, the presence of $Al_2O_3$ improves the kinetics of the ion-exchange process and increases the maximum compressive stress which can be obtained. However, when the total concentration of alkali oxides in the glass composition is less than the concentration of $Al_2O_3$, the addition of $Al_2O_3$ can actually decrease the compressive stress and depth of layer that are achievable through ion-exchange.

In the embodiments of the glass compositions described herein, the concentration of $Al_2O_3$ in the glass compositions is generally less than or equal to about 15 mol. % in order to achieve a glass composition having the desired low CTE and ion-exchange performance. For example, in some embodiments, the concentration of $Al_2O_3$ in the glass compositions is greater than or equal to about 9 mol. % and less than or equal to about 14 mol. %. In some embodiments, the concentration of $Al_2O_3$ in the glass compositions may be greater than or equal to about 10 mol. % and less than or equal to about 13 mol. %. In some other embodiments, the concentration of $Al_2O_3$ may be greater than or equal to about 10 mol. % and less than or equal to about 12 mol. %.

The glass compositions described herein also include alkali oxide $R_2O$ where R is at least one of Li, Na, K or combinations thereof. In the embodiments described herein the alkali oxide lowers the melting temperature and the liquidus temperature of the glass, thereby improving the formability of the glass composition. However, relative to other oxides included in the glass, alkali oxides increase the CTE of the glass composition while simultaneously improving the ion-exchange performance. For example, FIG. 1 graphically depicts the CTE of the glass composition (y-axis) as a function of the alkali oxide concentration (x-axis). As shown in FIG. 1, the CTE of the glass composition generally increases as the concentration of the alkali oxide increases. In general, the substitution of $K_2O$ for $Na_2O$ generally increases the CTE of the glass while the substitution of $Li_2O$ for $Na_2O$ decreases the CTE. Accordingly, the presence of smaller alkali ions in the glass causes a smaller increase in the CTE.

Figure 2:
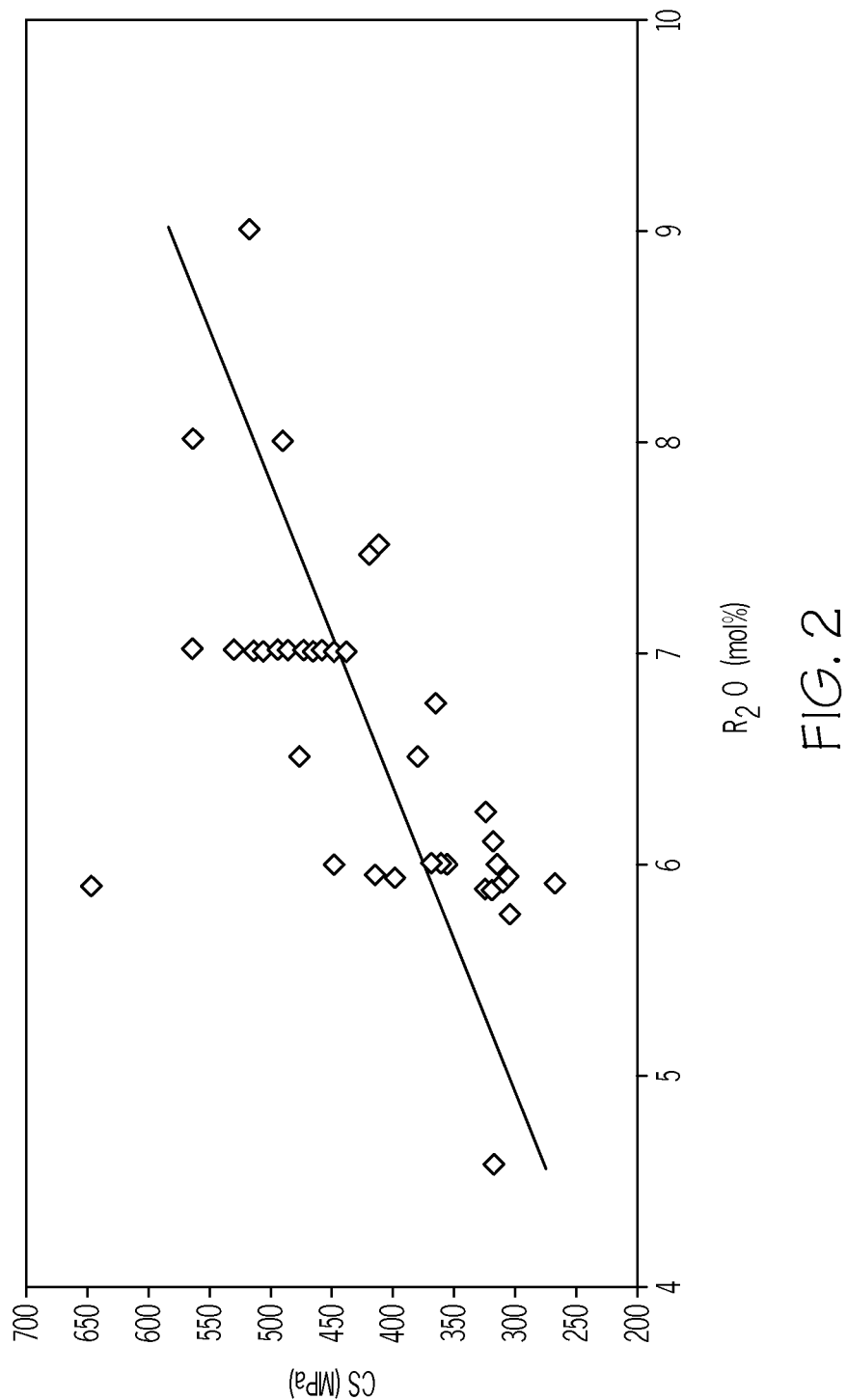
FIG. 2 graphically depicts the compressive stress (y-axis) of a glass composition as a function of the concentration of alkali oxide (x-axis) contained in the glass composition following ion-exchange at 410° C. for 8 hours in a $KNO_3$ salt bath.

Similarly, FIG. 2 graphically depicts the compressive stress of the glass composition following ion-exchange at 410° C. for 8 hours in a $KNO_3$ salt bath (y-axis) as a function of the alkali oxide concentration (x-axis). As shown in FIG. 2, the compressive stress which may be achieved through ion-exchange generally increases as the concentration of alkali oxide increases. Specifically, ion-exchange is generally facilitated by the exchange of smaller alkali ions (such as $Li^+$ or $Na^+$) in the glass with larger alkali ions (such as $K^+$) in a molten salt bath. Three types of ion-exchange generally occur: $Na^+$ for $Li^+$ exchanges which yield a deep depth of layer but low compressive stress; $K^+$ for $Li^+$ exchanges which yield a small depth of layer but relatively large compressive stress; and $K^+$ for $Na^+$ exchanges which yield an intermediate depth of layer and intermediate compressive stresses. In the embodiments where the glass compositions are used as glass cladding layers in a fusion formed laminated glass article, the compressive stress is of primary interest as a high depth of layer may be obtained in the glass cladding layers through the lamination process. Accordingly, the alkali oxide in the glass compositions described herein will generally include greater concentrations of $Li_2O$ and $Na_2O$ than $K_2O$ in order to facilitate $K^+$ for $Li^+$ exchanges and/or $K^+$ for $Na^+$ exchanges to obtain maximum surface compression.

In the embodiments described herein, the total concentration of alkali oxide $R_2O$ in the glass compositions is generally less than about 10 mol. %. For example, in some embodiments, the concentration of $R_2O$ in the glass compositions is greater than or equal to about 5 mol. % and less than or equal to about 10 mol. %. In some other embodiments, the concentration of $R_2O$ is greater than or equal to about 6 mol. % and less than or equal to about 9 mol. %.

In the embodiments described herein, the alkali oxide $R_2O$ may include at least one of $Li_2O$, $Na_2O$ and $K_2O$. The $Na_2O$ may be present in the glass composition in a concentration greater than or equal to about 0 mol. % and less than or equal to about 10 mol. % or even a concentration greater than or equal to about 7 mol. % and less than or equal to about 12 mol. %. The $Li_2O$ may be present in the glass composition in a concentration greater than or equal to about 0 mol. % and less than or equal to about 7 mol. % or even a concentration greater than or equal to about 5 mol. % and less than or equal to about 10 mol. %. The $K_2O$ may be present in the glass composition in a concentration greater than or equal to about 0 mol. % and less than or equal to about 2 mol. % or even a concentration greater than or equal to about 1 mol. % and less than or equal to about 3 mol. %.

If the glass compositions described herein were limited to $SiO_2$, $Al_2O_3$, and the alkali oxides as described above, the viscosity of the composition would be too high to be suitable for fusion forming. Accordingly, the glass compositions described herein include additional constituent components to ensure good melting quality and fusion formability. The components may include $B_2O_3$ and divalent cation oxides (such as MgO, CaO, SrO, BaO, and ZnO) which act as fluxes that reduce the melting temperature of the glass composition.

The glass compositions in the embodiments described herein may further comprise $B_2O_3$. Like $SiO_2$ and $Al_2O_3$, $B_2O_3$ contributes to the formation of the glass network. $B_2O_3$ is added to the glass compositions to decrease the viscosity and liquidus temperature of the glass compositions. Specifically, an increase in the concentration of $B_2O_3$ by 1 mol. % may decrease the temperature required to obtain an equivalent viscosity by 10° C. to 14° C., depending on the specific composition of the glass. However, $B_2O_3$ can lower the liquidus temperature of glass compositions by 18° C. to 22° C. per mol. % of $B_2O_3$. As such, $B_2O_3$ decreases the liquidus temperature of the glass composition more rapidly than it decreases the liquidus viscosity of the glass compositions, effectively increasing the liquidus viscosity. $B_2O_3$ can be added to the glass composition to soften the glass network with only minimal impact on the CTE. Accordingly, $B_2O_3$ is useful for improving the melting performance without increasing the CTE. Additions of $B_2O_3$ to the glass composition also reduce the Young's modulus of the glass composition and improve the intrinsic damage resistance of the glass. However, additions of $B_2O_3$ decrease the diffusivity of ions in the glass network and, as a result, negatively impact ion-exchange performance and generally decrease the amount of compressive stress that can be achieved.

In the embodiments described herein, $B_2O_3$ is generally present in the glass compositions in an amount less than or equal to about 10 mol. % in order to facilitate good melting performance without significantly diminishing the ion-exchange performance of the glass. For example, in some embodiments, $B_2O_3$ is present in the glass compositions in a concentration greater than or equal to about 0 mol. % and less than or equal to about 10 mol. %. In some of these embodiments, the concentration of $B_2O_3$ in the glass compositions may be greater than or equal to about 6 mol. % and less than or equal to about 9 mol. % or even less than or equal to about 8 mol. %. The concentration of $B_2O_3$ in the glass compositions may even be less than or equal to 7 mol. %.

The glass compositions described herein may further include divalent oxide MO, where M is an alkaline earth metal (such as Mg, Ca, Ba, and Sr) and/or Zn. The divalent oxides improve the melting behavior of the glass composition but increase the average coefficient of thermal expansion. When the divalent oxide includes alkaline earth oxides, the alkaline earth oxides do not increase the average coefficient of thermal expansion of the glass composition as much as the alkali oxides contained in the glass composition. However, the divalent oxides also decrease the mobility of alkali ions in the glass thereby decreasing the ion-exchangeability of the glass composition.

The decrease in the ion-exchangeability of the glass due to the introduction of the divalent oxides may be offset by substituting the alkali oxide $Na_2O$ for the divalent oxides CaO and MgO which increases both the average coefficient of thermal expansion of the glass composition and improves the ion-exchangeability of the glass composition. However, the substitution of $Na_2O$ for both the divalent oxide CaO and the alkali oxide $K_2O$ minimizes the increase in CTE while simultaneously improving the ion-exchangeability of the glass composition.

Figure 3:
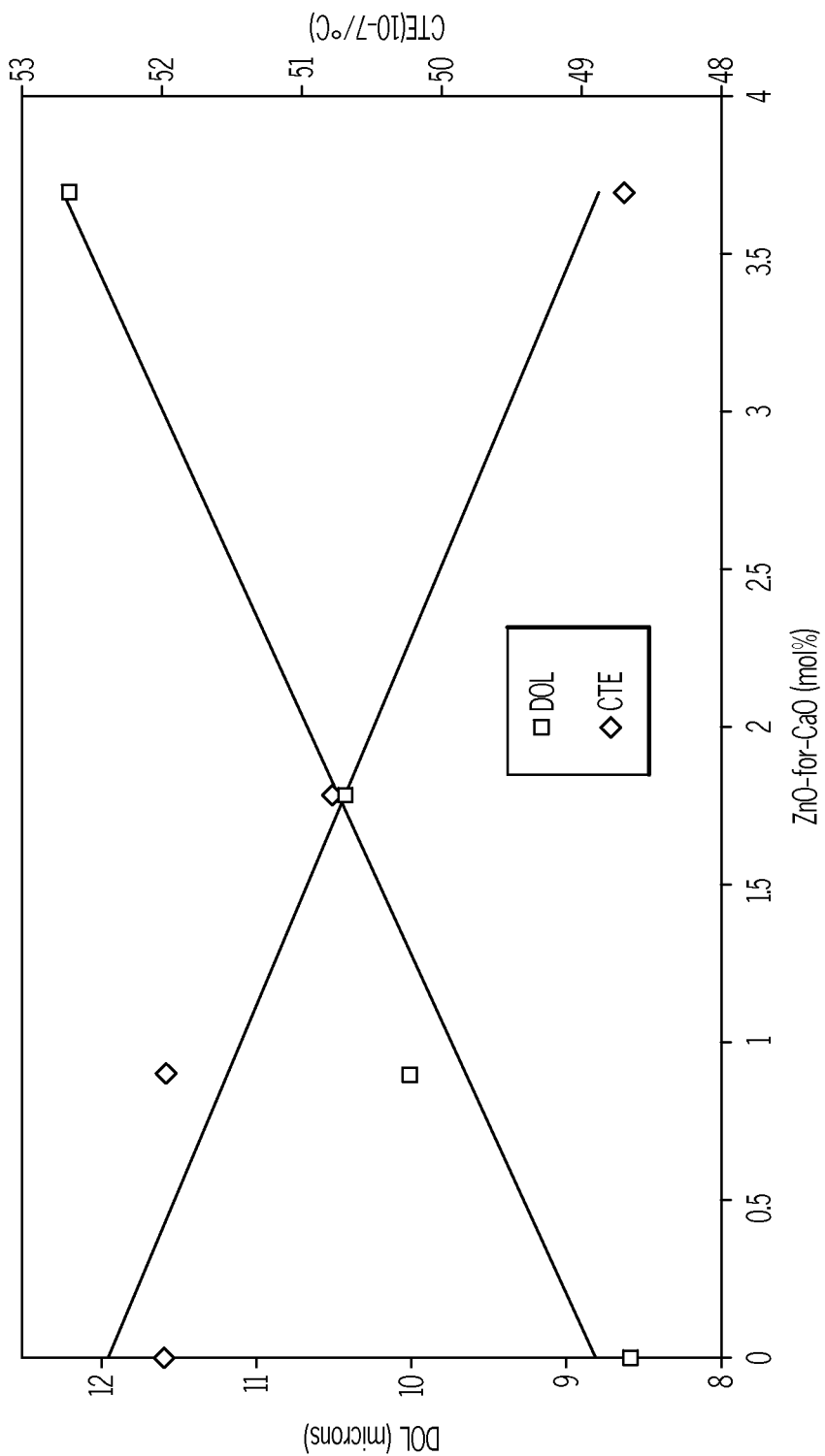
FIG. 3 graphically depicts the depth of layer and an average coefficient of thermal expansion (y-axes) of a glass composition following ion-exchange at 410° C. for 8 hours in a $KNO_3$ salt bath as a function of the substitution of ZnO for CaO (x-axis) in the glass composition.

The decrease in the ion-exchangeability is particularly pronounced when larger divalent oxides, such as CaO and BaO are included in the glass composition. Accordingly, to maintain good ion-exchangeability, the concentrations of CaO and BaO in the glass compositions are minimized. In contrast, additions of the divalent oxides MgO and ZnO minimize the adverse impact the divalent oxides have on alkali diffusivity and, as such, only minimally decrease the ion-exchange performance of the glass composition. Moreover, MgO and ZnO do not increase the CTE of the glass composition as much as CaO and BaO. For example, FIG. 3 graphically depicts the depth of layer and CTE (y-axes) as a function of the substitution of ZnO and CaO (x-axis) in the glass composition. The depth of layer was determined following ion-exchange of the glass at 410° C. for 8 hours in a $KNO_3$ salt bath. As shown in FIG. 3, as ZnO is substituted for CaO, the depth of layer of the compressive stress increases while the CTE of the glass article decreases.

Further, MgO and/or ZnO may be substituted for $B_2O_3$ to maintain the melting performance of the glass compositions while improving the ion-exchange performance with only minimal increase in the CTE. However, when the concentrations of MgO and ZnO in the glass composition are high, MgO and ZnO are prone to form forsterite ($Mg_2SiO_4$) and gahnite ($ZnAl_2O_4$), respectively, both of which increase the liquidus temperature of the glass composition and decrease the meltability of the glass.

In the embodiments described herein, the total concentration of divalent oxide MO (i.e., Mg, Ca, Ba and Zn) is greater than or equal to about 3 mol. % and less than or equal to about 11 mol. %. In some of these embodiments, the total concentration of divalent oxide MO is less than or equal to 9 mol. %, such as when the divalent oxide is present in a concentration which is greater than or equal to 3 mol. % and less than or equal to 9 mol. %. In some embodiments, the concentration of divalent oxide MO is greater than or equal to 7 mol. % and less than or equal to 9 mol. %.

As noted above, the divalent oxide MO includes oxides of Mg, Ca, Ba, Sr, Zn and combinations thereof. ZnO may be present in the glass composition in a concentration greater than or equal to about 0 mol. % and less than or equal to about 3 mol. % or even a concentration greater than or equal to about 1 mol. % and less than or equal to about 2 mol. %. MgO may be present in the glass composition in a concentration greater than or equal to about 0 mol. % and less than or equal to about 11 mol. % or even a concentration greater than or equal to about 5 mol. % and less than or equal to about 10 mol. %. CaO may be present in the glass composition in a concentration greater than or equal to about 0 mol. % and less than or equal to about 8 mol. % or even a concentration greater than or equal to about 2 mol. % and less than or equal to about 5 mol. %. BaO may be present in the glass composition in a concentration greater than or equal to about 0 mol. % and less than or equal to about 5 mol. % or even a concentration greater than or equal to about 1 mol. % and less than or equal to about 2 mol. %.

In some embodiments where the divalent oxide includes both MgO and CaO, the concentration of MgO in the glass composition may be greater than the concentration of CaO in order to improve ion-exchange performance and lower the CTE of the glass composition. For example, in some embodiments where the divalent oxide includes both MgO and CaO, the concentration of MgO may be greater than or equal to about 5 mol. % and the concentration of CaO is less than about 5 mol. %.

Similarly, in some embodiments where the divalent oxide includes both ZnO and CaO, the concentration of ZnO in the glass composition may be greater than the concentration of CaO in order to improve ion-exchange performance and lower the CTE of the glass composition.

The glass compositions described herein may optionally include one or more fining agents. The fining agents may include, for example, $SnO_2$, $As_2O_3$, $Sb_2O_3$ and combinations thereof. The fining agents may be present in the glass compositions in an amount greater than or equal to about 0 mol. % and less than or equal to about 0.7 mol. %. In exemplary embodiments, the fining agent is $SnO_2$. The $SnO_2$ may be present in the glass composition in a concentration greater than or equal to about 0 mol. % and less than or equal to about 0.7 mol. %. In these embodiments, $SnO_2$ may be present in the glass composition in a concentration which is greater than about 0 mol. % and less than or equal to about 0.7 mol. % or even less than or equal to about 0.15 mol. %.

The glass compositions described herein generally have an average coefficient of thermal expansion (CTE) which is less than or equal to about $55 \times 10^{-7}/°$ C. in a range from 20° C. to 300° C. In some embodiments, the CTE of the glass compositions may be less than or equal to about $50 \times 10^{-7}/°$ C. in a range from 20° C. to 300° C. In yet other embodiments, the CTE of the glass compositions may be less than or equal to about $45 \times 10^{-7}/°$ C. in a range from 20° C. to 300° C. The relatively low CTE values of the glass compositions are attributable, at least in part, to the relatively low total alkali content of the glass compositions. These relatively low CTEs make the glass compositions particularly well suited for use as glass cladding layers of a fusion-formed laminated glass article. Specifically, when low CTE glass cladding layers are paired with a glass core layer having a higher CTE during a fusion lamination process, the difference in the CTEs of the glass core layer and the glass cladding layers results in the formation of a compressive stress in the glass cladding layers upon cooling. Accordingly, the glass compositions described herein may be utilized to form a strengthened laminated glass article.

The glass compositions described herein are also amenable to strengthening by ion-exchange. The ion-exchange performance of the glass compositions described herein is determined by ion-exchanging a glass article formed from the glass composition in a molten bath of $KNO_3$ at a temperature of 410° C. for 8 hours. Thereafter, the compressive stress and depth of layer are measured by optical birefringence. In the embodiments of the glass compositions described herein, the glass compositions generally have a compressive stress greater than 400 MPa following ion-exchange under the aforementioned conditions. In some embodiments, the compressive stress may be greater than or equal to about 450 MPa or even greater than or equal to about 500 MPa. In some embodiments the compressive stress may be greater than or equal to about 550 MPa.

Further, the depth of layer of the compressive stress is generally greater than or equal to about 5 μm or even greater than or equal to about 10 μm.

Further, the glass compositions described herein have a liquidus viscosity suitable for fusion formation, such as by the fusion down-draw process and/or the fusion lamination process. In particular, the glass compositions described herein have a liquidus viscosity that is greater than or equal to about 35,000 Poise (35 kPoise). In some embodiments, the liquidus viscosity is greater than or equal to 50 kPoise or even greater than or equal to 100 kPoise.

Based on the foregoing, it should be understood that various embodiments of low CTE, ion-exchangeable glass compositions are disclosed herein. In a first exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba, and Zn. The glass composition generally has an average coefficient of thermal expansion of a glass formed from the glass composition is less than or equal to $55\times10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a second exemplary embodiment, a glass composition includes from about 65 mol. % to about 68 mol. % $SiO_2$; from about 10 mol. % to about 13 mol. % $Al_2O_3$; and from about 6 mol. % to about 9 mol. % $B_2O_3$ as glass network formers. The glass composition may also include from about 6 mol. % to less than 9 mol. % alkali oxide $R_2O$, wherein R is at least one of Li, Na, and K. The glass composition may also include from about 7 mol. % to about 10 mol. % of divalent oxide MO, wherein M is at least one of Mg, Ca, Ba, and Zn. The glass composition generally has an average coefficient of thermal expansion of a glass formed from the glass composition is less than or equal to $55\times10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a third exemplary embodiment, a glass composition includes from about 65 mol. % to about 70 mol. % $SiO_2$; from about 9 mol. % to about 14 mol. % $Al_2O_3$; and from about 0 mol. % to about 7 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba, and Zn. The glass composition generally has an average coefficient of thermal expansion of a glass formed from the glass composition is less than or equal to $55\times10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a fourth exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 9 mol. % of divalent oxide MO, wherein M is at least one of Mg, Ca, Ba, and Zn. The glass composition generally has an average coefficient of thermal expansion of a glass formed from the glass composition is less than or equal to $55\times10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a fifth exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein MO comprises MgO, and CaO and a concentration of MgO (mol. %) is greater than a concentration of CaO (mol. %). The glass composition generally has an average coefficient of thermal expansion of a glass formed from the glass composition is less than or equal to $55\times10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a sixth exemplary embodiment, a glass composition includes from about 65 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein MO comprises MgO and CaO and a concentration of MgO is greater than 5 mol. % and a concentration of CaO is less than 5 mol. %. The glass composition generally has an average coefficient of thermal expansion of a glass formed from the glass composition is less than or equal to $55\times10^{-7}/°$ C., a compressive stress in the glass composition is greater than or equal to 400 MPa following ion-exchange in a 100% $KNO_3$ salt bath at 410° C. for 8 hours, and a liquidus viscosity greater than or equal to 35 kPoise.

In a seventh exemplary embodiment, a glass composition includes from about 55 mol. % to about 70 mol. % $SiO_2$; from about 9 mol. % to about 14 mol. % $Al_2O_3$; and from about 0 mol. % to about 11 mol. % $B_2O_3$ as glass network formers. The glass composition may also include from about 5 mol. % to less than 10 mol. % alkali oxide $R_2O$, wherein R is at least one of Li, Na, and K. The glass composition may also include from about 3 mol. % to about 11 mol. % of divalent oxide MO, wherein M is at least one of Mg, Ca, Ba, and Zn. In this embodiment, the concentration of $B_2O_3$ may be less than about 7 mol. %. The concentration of the divalent oxide MO in this embodiment may be less than 9 mol. %. The divalent oxide MO may comprise both MgO and CaO and the concentration of the MgO (mol. %) may be greater than the concentration of CaO (mol. %), such as when the concentration of MgO is greater than about 5 mol % and the concentration of CaO is less than 5 mol. %. The glass composition generally has an average coefficient of thermal expansion of a glass formed from the glass composition is less than or equal to $55\times10^{-7}/°$ C., a compressive stress in the glass composition is greater than or equal to 400 MPa following ion-exchange in a 100% KNO₃ salt bath at 410° C. for 8 hours, and a liquidus viscosity greater than or equal to 35 kPoise.

While exemplary glass compositions have been described hereinabove with reference to specific compositional ranges for various constituent components (such as $SiO_2$, $Al_2O_3$, $B_2O_3$, and the like) of each glass composition, it should be understood that each compositional range of each constituent component may include one or more narrower compositional ranges for that constituent component, as described above. Further, it should also be understood that these narrower ranges of the constituent components and/or the relationships between various constituent components may be incorporated in any of the embodiments of the glass compositions described herein in order to produce a glass having the desired properties.

Figure 4:
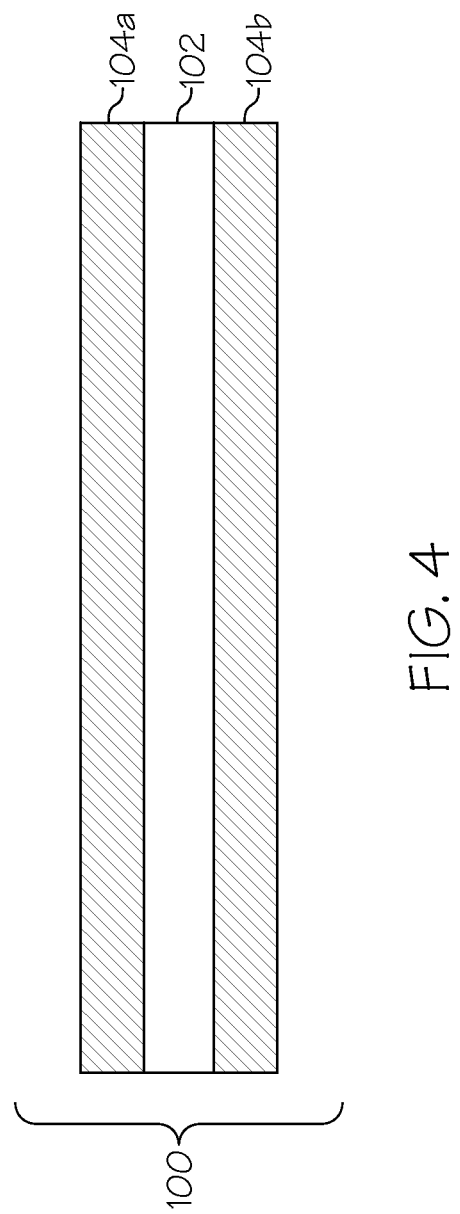
FIG. 4 schematically depicts a cross section of a laminated glass article according to one or more embodiments shown and described herein.

Referring now to FIG. 4, the glass compositions described herein may be used to form a glass article, such as the laminated glass article 100 schematically depicted in cross section in FIG. 4. The laminated glass article 100 generally comprises a glass core layer 102 and a pair of glass cladding layers 104a, 104b. The glass compositions described herein are particularly well suited for use as the glass claddings layers due to their relatively low coefficients of thermal expansion, as will be discussed in more detail herein.

FIG. 4 illustrates the glass core layer 102 shown comprising a first surface 103a and a second surface 103b which is opposed to the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional materials, such as adhesives, coating layers or the like, being disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 100 described herein, the glass cladding layers 104a, 104b are formed from a first glass composition having an average cladding coefficient of thermal expansion $CTE_{clad}$ and the glass core layer 102 is formed from a second, different glass composition which has an average core coefficient of thermal expansion $CTE_{core}$. The $CTE_{core}$ is greater than $CTE_{clad}$ which results in the glass cladding layers 104a, 104b being compressively stressed without being ion-exchanged or thermally tempered.

Figure 5:
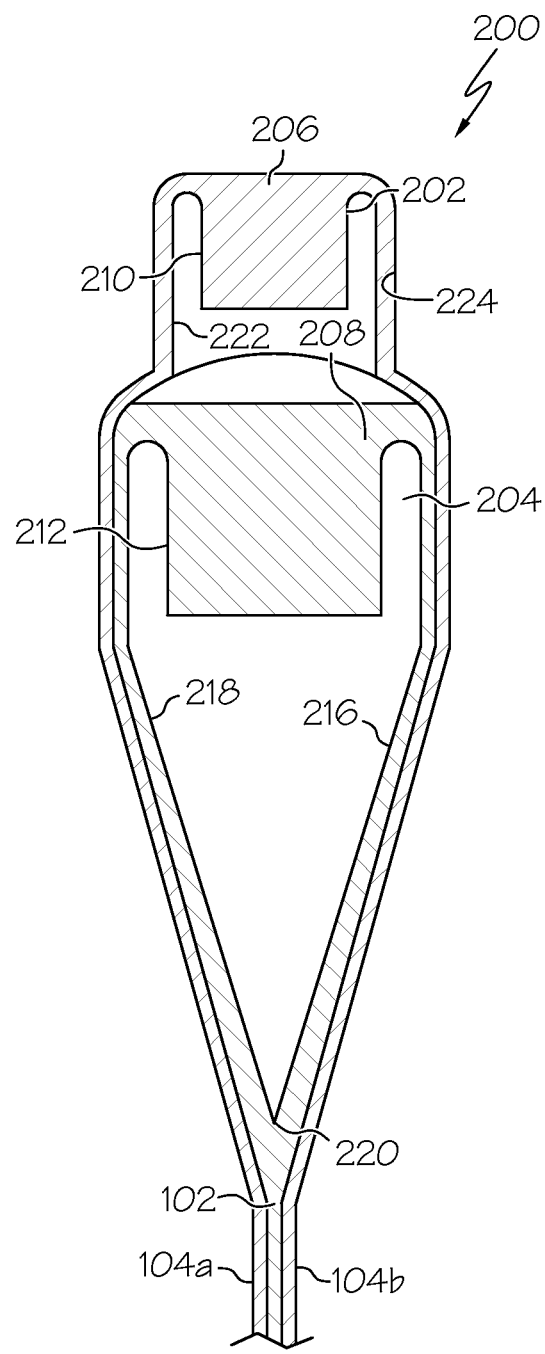
FIG. 5 schematically depicts a fusion draw process for making the glass article of FIG. 4.

Specifically, the glass articles 100 described herein may be formed by a fusion lamination process such as the process described in U.S. Pat. No. 4,214,886, which is incorporated herein by reference. Referring to FIG. 5 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments, described herein, the molten glass core composition 208 has an average core coefficient of thermal expansion $CTE_{core}$ which is greater than the average cladding coefficient of thermal expansion $CTE_{clad}$ of the molten glass cladding composition 206.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass article.

Simultaneously, the molten glass cladding compositions 206 overflows the trough 210 formed in the upper isopipe 202 and flows over outer forming surfaces 222, 224 of the upper isopipe 202. The molten glass cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, the molten glass core composition 208 generally has an average core coefficient of thermal expansion $CTE_{core}$ which is greater than the average cladding coefficient of thermal expansion $CTE_{clad}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause a compressive stresses to develop in the glass cladding layers 104a, 104b. The compressive stress increases the strength of the resulting laminated glass article.

Referring again to the laminated glass article 100 depicted in FIG. 4, the glass cladding layers 104a, 104b of the laminated glass article 100 are formed from a glass composition with a relatively low average coefficient of thermal expansion, such as the glass compositions described herein which have coefficients of thermal expansion less than or equal to $55 \times 10^{-7}$/° C. over the temperature range from about 20° C. to about 300° C.

For example, in one embodiment, the glass clad layer is formed from a glass composition having a low CTE, such as the glass compositions described hereinabove which include from about 65 mol. % to about 70 mol. % $SiO_2$; from about 9 mol. % to about 14 mol. % $Al_2O_3$; and from about 0 mol. % to about 11 mol. % $B_2O_3$ as glass network formers; from about 5 mol. % to less than 10 mol. % alkali oxide $R_2O$, wherein R is at least one of Li, Na, and K; from about 3 mol. % to about 11 mol. % of divalent oxide MO, wherein M is at least one of Mg, Ca, Ba, and Zn. These glass compositions generally have an average coefficient of thermal expansion which is less than or equal to $55 \times 10^{-7}$/° C. over the temperature range from about 20° C. to about 300° C. and are amenable to strengthening by ion-exchange. Due to the relatively low average coefficient of thermal expansion, the glass compositions are particularly well suited for use as the glass cladding layers of the laminated glass article.

In another exemplary embodiment, the glass clad layer may be formed from a glass composition with a low CTE, such as the glass compositions described hereinabove which include from about 65 mol. % to about 68 mol. % $SiO_2$; from about 10 mol. % to about 13 mol. % $Al_2O_3$; and from about 6 mol. % to about 9 mol. % $B_2O_3$ as glass network formers; from about 6 mol. % to less than 9 mol. % alkali oxide $R_2O$, wherein R is at least one of Li, Na, and K; and from about 7 mol. % to about 10 mol. % of divalent oxide MO, wherein M is at least one of Mg, Ca, Ba, and Zn. These glass compositions generally have an average coefficient of thermal expansion which is less than or equal to $55 \times 10^{-7}/°$ C. over the temperature range from about 20° C. to about 300° C. and are amenable to strengthening by ion-exchange.

While specific glass compositions for use as the glass cladding layers 104a, 104b have been described herein, it should be understood that any of the glass compositions described herein may be used to form the glass cladding layers 104a, 104b of the laminated glass article 100 due to the relatively low CTE of the glass compositions.

Further, while the glass cladding layers 104a, 104b of the laminated glass article 100 have been described hereinabove as being formed from a glass composition having a relatively low average coefficient of thermal expansion, the glass core layer 102 of the glass article 100 is formed from a glass composition which has a higher average coefficient of thermal expansion than the glass cladding layers 104a, 104b to facilitate the development of compressive stress in the cladding layers upon cooling of the laminate article following fusion formation. For example, the glass core layer may be formed from a glass composition comprising alkali ions, such as a glass composition described in co-pending U.S. Patent Application No. 61/604,869 entitled "High CTE Potassium Borosilicate Core Glasses and Glass Articles Comprising the Same" assigned to Corning Incorporated, which have coefficients of thermal expansion greater than or equal to $75 \times 10^{-7}/°$ C. in a temperature range from 20° C. to 800° C. For example, the core glass layer may be formed from a glass composition which comprises: from about 70 mol. % to about 80 mol. % $SiO_2$; from about 0 mol. % to about 8 mol. % $Al_2O_3$; from about 3 mol. % to about 10 mol. % $B_2O_3$; from about 0 mol. % to about 2 mol. % $Na_2O$; from about 10 mol. % to about 15 mol. % $K_2O$; and from about 5 mol. % to about 6 mol. % of alkaline earth oxide, wherein the alkaline earth oxide is at least one of CaO, SrO, and BaO without containing MgO. However, it should be understood that other glass compositions may also be used to form the glass core layer 102 of the laminated glass article 100, so long as the average coefficient of thermal expansion of the glass core layer 102 is greater than the average coefficient of thermal expansion of the glass cladding layers 104a, 104b.

Following formation, the laminated glass article may be ion-exchange strengthened to further increase the surface compression in the glass cladding layers 104a, 104b. In these embodiments, the laminated glass article 100 may be ion-exchange strengthened in a molten salt bath of $KNO_3$ for 8 hours at a temperature of 410° C. Upon removal from the salt bath, the glass article has a compressive stress greater than or equal to 400 MPa. In some embodiments, the compressive stress may be greater than or equal to about 450 MPa or even greater than or equal to about 500 MPa.

Examples

The embodiments of the glass compositions described herein will be further clarified by the following examples.

A plurality of exemplary glass compositions were prepared according to the batch compositions listed in Tables 1-6 below. Batches of the oxide constituent components were mixed, melted and formed into glass plates. The properties of the glass melt (i.e., the liquidus viscosity, liquidus temperature, annealing point, etc.) were measured and the results are reported in Tables 1-6. Following formation into glass plates, the samples were ion-exchanged in a $KNO_3$ salt bath for 8 hours at a temperature of 410° C. The resultant depth of layer and compressive stress were measured by optical birefringence. The results of the compressive stress and depth of layer measurements are reported in Tables 1-6. The "A" samples (i.e., samples A1, A2, etc.) had coefficients of thermal expansion less than or equal to $55 \times 10^{-7}/°$ C., compressive stress greater than or equal to 400 MPa, and liquidus viscosities greater than or equal to 35 kPoise. The "C" samples (i.e., samples C1, C2, etc.) did not meet at least one of these criteria (i.e., an average coefficient of thermal expansion less than or equal to $55 \times 10^{-7}/°$ C., compressive stress greater than or equal to 400 MPa, or a liquidus viscosity greater than or equal to 35 kPoise), and, as such, the "C" samples are presented herein as Comparative, non-inventive examples.

Of the various exemplary "A" compositions listed in Tables 1-6, Examples A11, A17, A18, and A25 are of particular interest. Each of these compositions had an average coefficient of thermal expansion less than or equal to $55 \times 10^{-7}/°$ C., a compressive stress greater than or equal to 400 MPa, and a liquidus viscosity greater than or equal to 35 kPoise. In particular, Example A11 is a lithium-containing glass with a CTE of $44.6 \times 10^{-7}/°$ C. and a liquidus viscosity greater than 300 kPoise. After ion-exchange strengthening, Example A11 had surface compressive stress of approximately 560 MPa. This composition combines particularly low CTE with a particularly high surface compressive stress.

Example A17 is a sodium-containing glass with a CTE of $50 \times 10^{-7}/°$ C. and a liquidus viscosity greater than 249 kPoise. Example A17 had a surface compressive stress of approximately 475 MPa, similar to several of the other "A" compositions. However, Example A17 had a depth of layer greater than 11 μm. This indicates that, for a given surface compression, the glass composition of Example A17 can be ion-exchanged in a shorter time period than other glass compositions, thereby improving manufacturing throughput. The deep depth of layer of this glass was obtained from having MgO as the only divalent cation oxide in the glass composition. While all of the divalent cation oxides decrease the depth of layer, MgO decreases the depth of layer to a lesser extent compared with CaO and BaO.

Example A18 is also a sodium-containing glass with a CTE of $52.8 \times 10^{-7}/°$ C. and a liquidus viscosity greater than 300 kPoise. Example A18 also had a surface compressive stress of approximately 490 MPa and a depth of layer of approximately 9 μm. The properties of this glass are attributable to the relatively low $B_2O_3$ content of this glass composition.

Example A25 is also a sodium-containing glass with a CTE of $49.5 \times 10^{-7}/°$ C. and a liquidus viscosity greater than 134 kPoise. Example A25 also had a relatively high surface compressive stress of approximately 545 MPa and a relatively deep depth of layer of approximately 9.9 μm. The properties of this glass are attributable to the fact that this glass composition is substantially free of $K_2O$ and contains MgO as the only divalent cation oxide.

TABLE 1

Exemplary Glass Compositions

| Composition (mol %) | C1 | C2 | C3 | C4 | A1 | C5 | C6 | A2 | C7 | C8 |
|---|---|---|---|---|---|---|---|---|---|---|
| $SiO_2$ | 63.3 | 64.8 | 61.8 | 64.38 | 62.23 | 62.31 | 63.3 | 63.3 | 63.3 | 63.3 |
| $Al_2O_3$ | 11.4 | 10.94 | 11.87 | 9.9 | 12.9 | 11.22 | 11.4 | 11.4 | 11.4 | 11.4 |
| $B_2O_3$ | 9.2 | 8.82 | 9.58 | 9.36 | 9.04 | 9.06 | 9.2 | 9.2 | 9.2 | 9.2 |
| MgO | 5.3 | 5.08 | 5.52 | 5.39 | 5.21 | 5.22 | 5.3 | 5.3 | 5.3 | 5.3 |
| CaO | 4.7 | 4.51 | 4.89 | 4.78 | 4.62 | 4.63 | 4.7 | 4.7 | 4.7 | 4.7 |
| BaO | | | | | | | | | | |
| ZnO | | | | | | | | | | |
| $Li_2O$ | | | | | | | | | 4.1 | 2.1 |
| $Na_2O$ | 4.2 | 4.03 | 4.37 | 4.27 | 4.13 | 5.7 | 5.2 | 5.7 | 0.1 | 2.1 |
| $K_2O$ | 1.8 | 1.73 | 1.87 | 1.83 | 1.77 | 1.77 | 0.8 | 0.3 | 1.8 | 1.8 |
| $SnO_2$ | 0.1 | 0.1 | 0.1 | 0.1 | 0.1 | 0.1 | 0.1 | 0.1 | 0.1 | 0.1 |
| Anneal Pt (C.) | 588 | 587 | 582 | 576 | 593 | 570 | 584 | 582 | 567 | 575 |
| Strain Pt (C.) | 639 | 639 | 632 | 625 | 647 | 618 | 635 | 632 | 612 | 622 |
| Softening Pt (C.) | 879 | 882 | 862 | 860 | 883 | 843 | 867 | 862 | 831.2 | 848.9 |
| CTE ($\times 10^{-7}$/C.) | 50.7 | 49 | 51.6 | 52.4 | 49.7 | 56.4 | 49.1 | 49.8 | 45 | 46.4 |
| Density (g/cm^3) | 2.395 | 2.387 | 2.404 | 2.39 | 2.408 | 2.413 | 2.397 | 2.4 | 2.396 | 2.399 |
| 24-h Air Liquidus (C.) | | 1000 | 1030 | 1020 | 1060 | 1000 | 1020 | 1025 | 950 | 990 |
| 24-h Internal Liquidus (C.) | | 990 | 1015 | 1010 | 1055 | 1000 | 1010 | 1015 | 945 | 980 |
| 24-h Pt Liquidus (C.) | | 990 | 1000 | 1005 | 1040 | 990 | 995 | 1000 | 930 | 970 |
| Primary Devit Phase | | Albite | Albite | Unknown | Albite | Unknown | Albite | Albite | Albite | Albite |
| T(200 Poise) (C.) | | | | | | | | | 1505 | 1539 |
| T(35 kPoise) (C.) | | | | | | | | | 1100 | 1128 |
| Liquidus Visc (Poise) | | | | | | | | | 9.17E+05 | 5.97E+05 |
| Compressive stress (MPa) | 315 | 306 | 325 | 317 | | 418 | 361 | | 357 | 369 |
| Depth of layer (μm) | 8 | 9 | 8 | 13 | | 12 | 6 | | 9 | 8 |

TABLE 2

Exemplary Glass Compositions

| Composition (mol %) | C9 | C10 | C11 | A3 | A4 | A5 | C12 | C13 | C14 | A6 |
|---|---|---|---|---|---|---|---|---|---|---|
| $SiO_2$ | 633 | 64.34 | 62.25 | 64.3 | 65.3 | 66.3 | 64.3 | 62.3 | 63.3 | 63.3 |
| $Al_2O_3$ | 11.4 | 11.59 | 11.21 | 11.4 | 11.4 | 11.4 | 11.58 | 11.22 | 11.4 | 11.4 |
| $B_2O_3$ | 9.2 | 7.7 | 10.7 | 8.2 | 7.2 | 6.2 | 9.34 | 9.06 | 9.2 | 9.2 |
| MgO | 5.3 | 5.39 | 5.21 | 5.3 | 5.3 | 5.3 | 5.38 | 5.22 | 4.24 | 6.06 |
| CaO | 4.7 | 4.78 | 4.62 | 3.7 | 3.7 | 3.7 | 3.2 | 6.2 | 3.76 | 5.37 |
| BaO | | | | | | | | | | |
| ZnO | | | | | | | | | | |
| $Li_2O$ | 1 | | | | | | | | | |
| $Na_2O$ | 3.2 | 4.27 | 4.13 | 6.2 | 6.2 | 6.2 | 4.27 | 4.13 | 6.93 | 3.96 |
| $K_2O$ | 1.8 | 1.83 | 1.77 | 0.8 | 0.8 | 0.8 | 1.83 | 1.77 | 1.07 | 0.61 |
| $SnO_2$ | 0.1 | 0.1 | 0.1 | 0.1 | 0.1 | 0.1 | 0.1 | 0.1 | 0.1 | 0.1 |
| Anneal Pt (C.) | 583 | 598 | 576 | 592 | 599 | 608 | 587 | 584 | 566 | 598 |
| Strain Pt (C.) | 630 | 650 | 626 | 642 | 649 | 659 | 640 | 633 | 613 | 647 |
| Softening Pt (C.) | 861.7 | 888 | 856 | 877.9 | 890.8 | 906.2 | 888 | 860 | 840.5 | 859.7 |
| CTE ($\times 10^{-7}$/C.) | 48.4 | 50.9 | 51.2 | 51.4 | 52 | 51 | 48.7 | 52.3 | 57.8 | 45 |
| Density (g/cm^3) | 2.4 | 2.405 | 2.385 | 2.399 | 2.403 | 2.403 | 2.377 | 2.414 | 2.397 | 2.409 |
| 24-h Air Liquidus (C.) | 1010 | 1050 | 1000 | 1025 | 1040 | 1105 | | | 980 | 1020 |
| 24-h Internal Liquidus (C.) | 1000 | 1040 | 980 | 1015 | 1030 | 1100 | | | 980 | 1000 |
| 24-h Pt Liquidus (C.) | 990 | 1030 | 965 | 1000 | 1020 | 1065 | | | 970 | 990 |
| Primary Devit Phase | Albite | Albite | Albite | Albite | Unknown | Unknown | | | Unknown | Albite |
| T(200 Poise) (C.) | | | | | 1598 | | | | | |
| T(35 kPoise) (C.) | | | | | 1177 | | | | | |
| Liquidus Visc (Poise) | | | | | 5.30E+05 | | | | | |
| Compressive stress (MPa) | 370 | 316 | 308 | 436 | 446 | 440 | 318 | 269 | 561 | |

TABLE 2-continued

Exemplary Glass Compositions

| Composition (mol %) | C9 | C10 | C11 | A3 | A4 | A5 | C12 | C13 | C14 | A6 |
|---|---|---|---|---|---|---|---|---|---|---|
| Depth of layer (μm) | 7 | 8 | 8 | 8 | 8 | 9 | 9 | 7 | 12 | |

TABLE 3

Exemplary Glass Compositions

| Composition (mol %) | C15 | A7 | A8 | C16 | C17 | A9 | A10 | A11 | A12 | C18 |
|---|---|---|---|---|---|---|---|---|---|---|
| $SiO_2$ | 62.67 | 62.03 | 63.3 | 63.3 | 63.3 | 63.3 | 63.3 | 63.3 | 65.3 | 63.3 |
| $Al_2O_3$ | 11.29 | 11.17 | 11.4 | 11.4 | 11.4 | 11.4 | 11.4 | 11.4 | 11.4 | 11.4 |
| $B_2O_3$ | 9.11 | 9.02 | 9.2 | 9.2 | 9.2 | 9.2 | 9.2 | 9.2 | 7.2 | 9.2 |
| MgO | 5.25 | 5.19 | 5.3 | 5.3 | 3.8 | 5.3 | 5.3 | 5.3 | 5.3 | 5.3 |
| CaO | 4.65 | 4.61 | 3.2 | 1.7 | 4.7 | 4.2 | 3.7 | 3.7 | 4.7 | |
| BaO | 1 | 2 | 0 | 0 | 0 | 0 | 0 | | | |
| ZnO | | | | | | | | | | 4.7 |
| $Li_2O$ | | | | | | | | 5.1 | 4.1 | 4.1 |
| $Na_2O$ | 4.16 | 4.12 | 5.7 | 7.2 | 5.7 | 5.2 | 6.2 | 0.1 | 0.1 | 0.1 |
| $K_2O$ | 1.78 | 1.76 | 1.8 | 1.8 | 1.8 | 1.3 | 0.8 | 1.8 | 1.8 | 1.8 |
| $SnO_2$ | 0.1 | 0.1 | 0.1 | 0.1 | 0.1 | 0.1 | 0.1 | 0.1 | 0.1 | 0.1 |
| Anneal Pt (C.) | 584 | 580 | 570 | 558 | 574 | 580 | 574 | 558 | 582 | 562 |
| Strain Pt (C.) | 631 | 628 | 621 | 608 | 623 | 628 | 624 | 601 | 628 | 608 |
| Softening Pt (C.) | 850.5 | 821.8 | 862 | 852 | 860 | 859.3 | 849.4 | 815.5 | 851.7 | 830.3 |
| CTE ($\times 10^{-7}$/C.) | 51.8 | 54.8 | 53.4 | 60.5 | 55.2 | 51.9 | 52 | 44.6 | 43.7 | 45 |
| Density (g/cm^3) | 2.447 | 2.503 | 2.388 | 2.379 | 2.395 | 2.399 | 2.394 | 2.383 | 2.398 | 2.434 |
| 24-h Air Liquidus (C.) | 980 | 1010 | | | | 1015 | 1010 | 990 | 990 | >1250 |
| 24-h Internal Liquidus (C.) | 970 | 1000 | | | | 1010 | 1000 | 975 | 980 | >1250 |
| 24-h Pt Liquidus (C.) | 970 | 990 | | | | 1000 | 980 | 970 | 980 | >1250 |
| Primary Devit Phase | Unknown | Unknown | | | | Unknown | Unknown | Unknown | Unknown | Unknown |
| T(200 Poise) (C.) | | | | | | | | 1497 | 1558 | 1506 |
| T(35 kPoise) (C.) | | | | | | | | 1086 | 1142 | 1102 |
| Liquidus Visc (Poise) | | | | | | | | 3.36E+05 | 1.11E+06 | <3334 |
| Compressive stress (MPa) | 396 | 645 | 412 | 517 | 412 | 476 | 529 | 563 | 447 | 372 |
| Depth of layer (μm) | 7 | 8 | 14 | 21 | 12 | 7 | 8 | 6.4 | 7.8 | 6.7 |

TABLE 4

Exemplary Glass Compositions

| Composition (mol %) | A13 | A14 | C19 | A15 | A16 | A17 | A18 | C20 | A19 |
|---|---|---|---|---|---|---|---|---|---|
| $SiO_2$ | 65.3 | 65.3 | 65.3 | 65.3 | 65.3 | 65.3 | 65.3 | 65.3 | 65.3 |
| $Al_2O_3$ | 11.4 | 11.4 | 11.4 | 11.4 | 11.4 | 11.4 | 11.4 | 11.4 | 11.4 |
| $B_2O_3$ | 7.2 | 7.2 | 7.2 | 7.2 | 7.2 | 7.2 | 5.3 | 3.5 | 5.3 |
| MgO | 5.3 | 5.3 | 5.3 | 6.2 | 7.1 | 9 | 5.3 | 5.3 | 7.2 |
| CaO | 2.8 | 1.9 | | 2.8 | 1.9 | | 3.7 | 3.7 | 3.7 |
| BaO | | | | | | | | | |
| ZnO | 0.9 | 1.8 | 3.7 | | | | 1.9 | 3.7 | |
| $Li_2O$ | | | | | | | | | |
| $Na_2O$ | 6.2 | 6.2 | 6.2 | 6.2 | 6.2 | 6.2 | 6.2 | 6.2 | 6.2 |
| $K_2O$ | 0.8 | 0.8 | 0.8 | 0.8 | 0.8 | 0.8 | 0.8 | 0.8 | 0.8 |
| $SnO_2$ | 0.1 | 0.1 | 0.1 | 0.1 | 0.1 | 0.1 | 0.1 | 0.1 | 0.1 |

TABLE 4-continued

Exemplary Glass Compositions

| Composition (mol %) | A13 | A14 | C19 | A15 | A16 | A17 | A18 | C20 | A19 |
|---|---|---|---|---|---|---|---|---|---|
| Anneal Pt (C.) | 599 | 599 | 595 | 603 | 607 | 615 | 610 | 618 | 616 |
| Strain Pt (C.) | 648 | 648 | 645 | 652 | 657 | 665 | 658 | 666 | 665 |
| Softening Pt (C.) | 888.3 | 886.2 | 884.3 | 890.1 | 893.5 | 900 | 889.2 | 893.8 | 894.7 |
| CTE (×10^−7/C.) | 52 | 50.8 | 48.7 | 51.2 | 51.2 | 50 | 52.8 | 53.3 | 54 |
| Density (g/cm^3) | 2.409 | 2.416 | 2.433 | 2.397 | 2.392 | 2.386 | 2.451 | 2.501 | 2.426 |
| 24-h Air Liquidus (C.) | 1040 | 1140 | >1260 | 1065 | 1085 | 1090 | 1065 | 1185 | 1110 |
| 24-h Internal Liquidus (C.) | 1030 | 1135 | >1260 | 1050 | 1070 | 1085 | 1060 | 1170 | 1105 |
| 24-h Pt Liquidus (C.) | 1000 | 1125 | >1260 | 1030 | 1050 | 1080 | 1055 | 1160 | 1100 |
| Primary Devit Phase | Unknown | Gahnite | Gahnite | Unknown | Unknown | Unknown | Gahnite | Gahnite | Unknown |
| T(200 Poise) (C.) | 1601 | 1595 | 1590 | 1597 | 1598 | 1600 | 1587 | 1577 | 1595 |
| T(35 kPoise) (C.) | 1174 | 1170 | 1172 | 1177 | 1174 | 1184 | 1170 | 1167 | 1172 |
| Liquidus Visc (Poise) | 6.41E+05 | 6.56E+04 | <8585 | 4.33E+05 | 2.59E+05 | 2.49E+05 | 3.13E+05 | 3.33E+04 | 1.27E+05 |
| Compressive stress (MPa) | 491 | 483 | 457 | 472 | 469 | 463 | 491 | 506 | 511 |
| Depth of layer (μm) | 10.0 | 10.4 | 12.2 | 10.0 | 10.6 | 11.8 | 9.1 | 7.1 | 9.1 |

TABLE 5

Exemplary Glass Compositions

| Composition (mol %) | A20 | A21 | A22 | A23 | C21 | A24 |
|---|---|---|---|---|---|---|
| $SiO_2$ | 65.3 | 67.3 | 65.3 | 67.3 | 65.3 | 65.3 |
| $Al_2O_3$ | 11.4 | 11.4 | 11.4 | 10.4 | 13.4 | 11.4 |
| $B_2O_3$ | 7.2 | 5.2 | 5.7 | 6.2 | 5.2 | 6.2 |
| MgO | 8.1 | 9 | 9 | 9 | 9 | 9 |
| CaO | | | | | | |
| BaO | | | | | | |
| ZnO | 0.9 | | | | | 1 |
| $Li_2O$ | | | | | | |
| $Na_2O$ | 6.2 | 6.2 | 6.2 | 6.2 | 6.2 | 6.2 |
| $K_2O$ | 0.8 | 0.8 | 0.8 | 0.8 | 0.8 | 0.8 |
| $SnO_2$ | 0.1 | 0.1 | 0.1 | 0.1 | 0.1 | 0.1 |
| $TiO_2$ | | | 1.5 | | | |
| Anneal Pt (C.) | 660 | 686 | 669 | 670 | 694 | 668 |
| Strain Pt (C.) | 610 | 634 | 620 | 619 | 642 | 618 |
| Softening Pt (C.) | 895.9 | 927.2 | 903 | 913.7 | 931.6 | 903.1 |
| CTE (×10^−7/C.) | 49.6 | 48.7 | 49.6 | 50 | 47.6 | 49.9 |
| Density (g/cm^3) | 2.397 | 2.393 | 2.407 | 2.381 | 2.41 | 2.412 |
| 24-h Air Liquidus (C.) | 1170 | 1180 | 1150 | 1200 | 1230 | 1160 |
| 24-h Internal Liquidus (C.) | 1160 | 1180 | 1150 | 1190 | 1230 | 1160 |
| 24-h Pt Liquidus (C.) | 1145 | 1170 | 1150 | 1180 | 1230 | 1140 |
| Primary Devit Phase | Gahnite | Unknown | Unknown | Unknown | Unknown | Gahnite |
| T(200 Poise) (C.) | 1594 | 1631 | 1591 | 1635 | 1597 | 1589 |
| T(35 kPoise) (C.) | 1178 | 1213 | 1181 | 1204 | 1202 | 1179 |
| Liquidus Visc (Poise) | 48646 | 62829 | 62206 | 44386 | 21104 | 49313 |
| Compressive stress (MPa) | 454 | 469 | 465 | 458 | 470 | 465 |
| Depth of layer (μm) | 11.6 | 12.1 | 11.5 | 14.7 | 8.2 | 10.9 |

| Exemplary Glass Compositions | | | | | | |
|---|---|---|---|---|---|---|
| Composition (mol %) | A25 | A26 | C22 | C23 | A27 | C24 |
| SiO$_2$ | 65.3 | 63.3 | 63.3 | 63.3 | 65.3 | 65.3 |
| Al$_2$O$_3$ | 11.4 | 11.4 | 11.4 | 11.4 | 11.4 | 11.4 |
| B$_2$O$_3$ | 7.2 | 9.2 | 9.2 | 9.2 | 7.2 | 4.2 |
| MgO | 8.8 | 5.3 | 9 | 8 | 5.3 | 7.3 |
| CaO | | 2.7 | | | 2.7 | 2.7 |
| BaO | | | | | | |
| ZnO | | | | 1 | | 1 |
| Li$_2$O | | 6.1 | 5.1 | 5.1 | 6.1 | 6.1 |
| Na$_2$O | 7.2 | 0.1 | 0.1 | 0.1 | 0.1 | 0.1 |
| K$_2$O | | 1.8 | 1.8 | 1.8 | 1.8 | 1.8 |
| SnO$_2$ | 0.1 | 0.1 | 0.1 | 0.1 | 0.1 | 0.1 |
| TiO$_2$ | | | | | | |
| Anneal Pt (C.) | 662 | 592 | 616 | 611 | 605 | 621 |
| Strain Pt (C.) | 612 | 550 | 571 | 567 | 561 | 577 |
| Softening Pt (C.) | 897.1 | 804.7 | 832.8 | 828.2 | 826.2 | 838.5 |
| CTE (x10$^{-7}$/C.) | 49.5 | 48.2 | 44.7 | 44 | 47.8 | 48.4 |
| Density (g/cm$^3$) | 2.385 | 2.375 | 2.367 | 2.382 | 2.383 | 2.437 |
| 24-h Air Liquidus (C.) | 1120 | 1020 | 1115 | 1110 | 1065 | 1120 |
| 24-h Internal Liquidus (C.) | 1105 | 1015 | 1110 | 1100 | 1060 | 1110 |
| 24-h Pt Liquidus (C.) | 1105 | 1010 | 1090 | 1085 | 1050 | 1100 |
| Primary Devit Phase | Albite | b-spodu. | Unknown | Gahnite | b-spodu. | b-spodu. |
| T(200 Poise) (C.) | 1589 | 1495 | 1501 | 1497 | 1529 | 1516 |
| T(35 kPoise) (C.) | 1176 | 1079 | 1099 | 1092 | 1105 | 1102 |
| Liquidus Visc (Poise) | 134059 | 116272 | 28646 | 30251 | 77971 | 30215 |
| Compressive stress (MPa) | 545 | | 389 | 404 | 565 | |
| Depth of layer (μm) | 9.9 | | 6.5 | 6.4 | 6.3 | |

It should now be understood that the glass compositions described herein have relatively low coefficients of thermal expansion. As such, the glass compositions described herein are particularly well suited for use in conjunction with glass compositions with relatively high coefficients of thermal expansion to form a compressively stressed laminated glass article by the fusion laminate process. These glass articles may be employed in a variety of consumer electronic devices including, without limitation, mobile telephones, personal music players, tablet computers, LCD and LED displays, automated teller machines and the like.

It should also be understood that the properties of the glass compositions described herein, (e.g., the liquidus viscosity, the liquidus temperature, and the like) make the glass compositions well suited for use with fusion forming processes, such as the fusion down draw process or the fusion lamination process.

Moreover, the glass compositions described herein are amenable to strengthening by ion-exchange. As such, the strength of the laminated glass articles which utilize the glass compositions described herein as glass cladding layers may be further improved by ion-exchanging the glass articles following lamination. Such glass articles may be particularly well suited for use as cover glasses for touch screen displays, mobile electronic devices and the like.

Further, while specific reference has been made herein to the use of the glass compositions as cladding layers of a laminated glass article, it should be understood that the glass compositions may also be used to independently form glass articles (i.e., non-laminated glass articles) such as, for example, cover glasses for electronic devices and other, similar glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   from about 65 mol. % to about 70 mol. % SiO$_2$;
   from about 9 mol. % to about 14 mol. % Al$_2$O$_3$;
   from 0 mol. % to about 11 mol. % B$_2$O$_3$;
   from about 5 mol. % to less than 10 mol. % alkali oxide R$_2$O, wherein R is at least one of Li, Na, or K;
   from 7 mol. % to about 10 mol. % divalent oxide MO, wherein M is at least one of Mg, Ca, Ba, Sr, or Zn, and a concentration of ZnO is from 0 mol. % to about 3 mol. %;
   an average coefficient of thermal expansion less than or equal to 55×10$^{-7}$/° C.; and
   a liquidus viscosity greater than or equal to 35 kPoise;
   wherein a compressive stress in a glass article formed from the glass composition is greater than or equal to 400 MPa following ion-exchange in a 100% KNO$_3$ salt bath at 410° C. for 8 hours.

2. The glass composition of claim 1, wherein the glass composition comprises:
   from about 65 mol. % to about 68 mol. % SiO$_2$;
   from about 10 mol. % to about 13 mol. % Al$_2$O$_3$;
   from about 6 mol. % to about 9 mol. % B$_2$O$_3$;
   from about 6 mol. % to less than 9 mol. % alkali oxide R$_2$O; and
   from about 7 mol. % to about 10 mol. % of divalent oxide MO, wherein M is at least one of Mg, Ca, or Zn.

3. The glass composition of claim 1, wherein a concentration of B$_2$O$_3$ is less than 7 mol. %.

4. The glass composition of claim 1, wherein a concentration of divalent oxide MO is less than 9 mol. %.

5. The glass composition of claim 1, wherein the divalent oxide MO comprises MgO and CaO and a concentration of MgO (mol. %) is greater than a concentration of CaO (mol. %).

6. The glass composition of claim 1, wherein the divalent oxide MO comprises MgO and CaO and a concentration of MgO is greater than 5 mol. % and a concentration of CaO is less than 5 mol. %.

7. The glass composition of claim 1, wherein the glass composition is ion-exchange strengthened.

8. A glass article comprising:
a glass core layer disposed between a first glass cladding layer and a second glass cladding layer, wherein the first glass cladding layer and the second glass cladding layer are formed from the glass composition of claim 1.

9. The glass article of claim 8, wherein a concentration of $B_2O_3$ in the first glass cladding layer and the second glass cladding layer is less than about 7 mol. %.

10. The glass article of claim 8, wherein a concentration of the divalent oxide MO in the first glass cladding layer and the second glass cladding layer is less than 9 mol. %.

11. The glass article of claim 8, wherein the divalent oxide MO comprises MgO and CaO and a concentration of MgO (mol. %) is greater than a concentration of CaO (mol. %).

12. The glass article of claim 8, wherein the divalent oxide MO comprises MgO and CaO and a concentration of MgO is greater than 5 mol. % and a concentration of CaO is less than 5 mol. %.

13. The glass article of claim 8, wherein the first glass cladding layer and the second glass cladding layer are ion-exchange strengthened.

14. The glass article of claim 8, wherein the first glass cladding layer and the second glass cladding layer have a compressive stress greater than or equal to 400 MPa.

15. The glass article of claim 8, wherein:
the glass core layer has an average core coefficient of thermal expansion $CTE_{core}$; and
the first glass cladding layer and the second glass cladding layer have an average cladding coefficient of thermal expansion $CTE_{clad}$ which is less than the average core coefficient of thermal expansion $CTE_{core}$.

16. The glass article of claim 15, wherein the average cladding coefficient of thermal expansion $CTE_{clad}$ is less than or equal to $55 \times 10^{-7}/°$ C. in a temperature range from 20° C. to 300° C.

17. The glass article of claim 8, wherein a first surface of the glass core layer is directly adjacent the first glass cladding layer, and wherein a second surface of the glass core layer is directly adjacent the second glass cladding layer.

18. The glass article of claim 8, wherein a diffusive layer is disposed between at least one of the first glass cladding layer or the second glass cladding layer and the glass core layer.

19. The glass article of claim 18, wherein the average coefficient of thermal expansion of the diffusive layer has a value between that of an average core coefficient of thermal expansion of the glass core layer and an average cladding coefficient of thermal expansion of the at least one of the first glass cladding layer or the second glass cladding layer.

* * * * *